United States Patent [19]

Dyrdahl

[11] 4,159,731
[45] Jul. 3, 1979

[54] TRACTION DEVICE

[76] Inventor: Gerald L. Dyrdahl, Rte. 1 - Box 198A, Bagley, Minn. 56621

[21] Appl. No.: 826,043

[22] Filed: Aug. 19, 1977

[51] Int. Cl.² .................. B60C 27/20; B60C 27/04
[52] U.S. Cl. ...................... 152/228; 152/225 R; 152/226
[58] Field of Search ............ 152/225 R, 225 C, 226, 152/227, 228, 232, 233, 208, 221, 222, 229, 230

[56] References Cited

U.S. PATENT DOCUMENTS

| | | | |
|---|---|---|---|
| 2,007,843 | 7/1935 | Woolgar | 152/226 |
| 2,722,260 | 11/1955 | Renwick, Sr. | 152/225 C |
| 2,738,820 | 3/1956 | Browning et al. | 152/225 R |
| 2,775,993 | 1/1957 | Young | 152/225 C |
| 2,808,094 | 10/1957 | Marchionda | 152/225 C |
| 3,019,830 | 2/1962 | Shelby | 152/225 R |
| 3,245,451 | 4/1966 | Gellman | 152/225 C |

FOREIGN PATENT DOCUMENTS

| | | | |
|---|---|---|---|
| 627909 | 9/1961 | Canada | 152/225 C |
| 571761 | 2/1933 | Fed. Rep. of Germany | 152/225 C |
| 1032273 | 6/1953 | France | 152/225 R |

*Primary Examiner*—Francis S. Husar
*Assistant Examiner*—Randolph A. Reese

[57] ABSTRACT

A traction device for vehicle wheels is provided comprising spaced traction plates having traction bars extending from both major surfaces thereof, the plates being interconnected by U-shaped tire side wall gripping elements, the device being expandable to span tires of different widths and including a spring biased shoe carried by the bight portion of one of the U-shaped gripping elements adapted to more tightly grip the tires as forces tending to pull the device from the tire are applied, but which shoe is easily manually released to remove the device from a tire.

8 Claims, 7 Drawing Figures

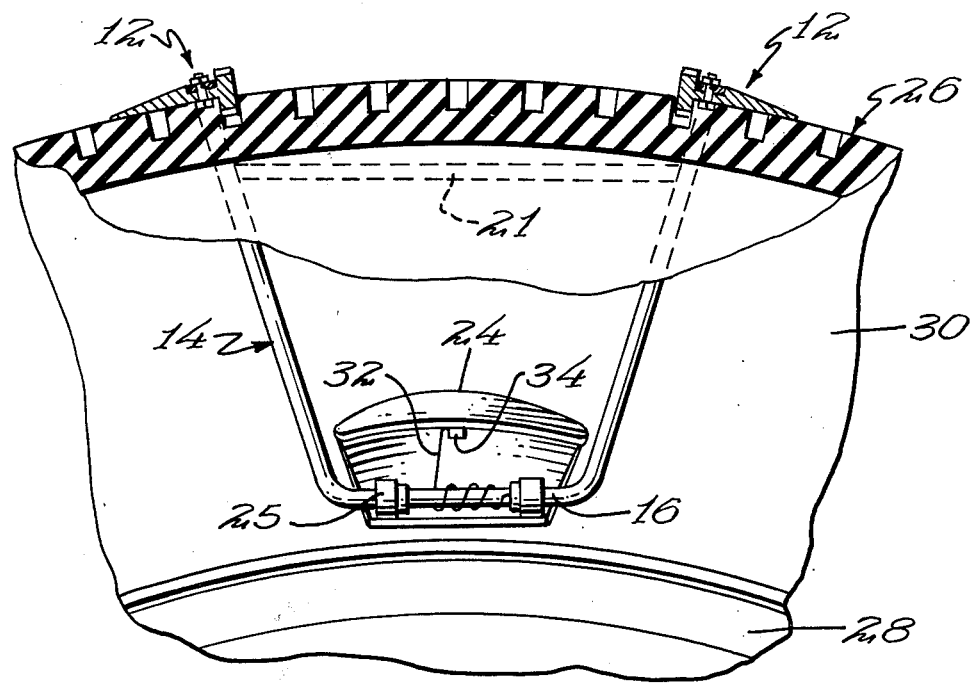
FIG. 3
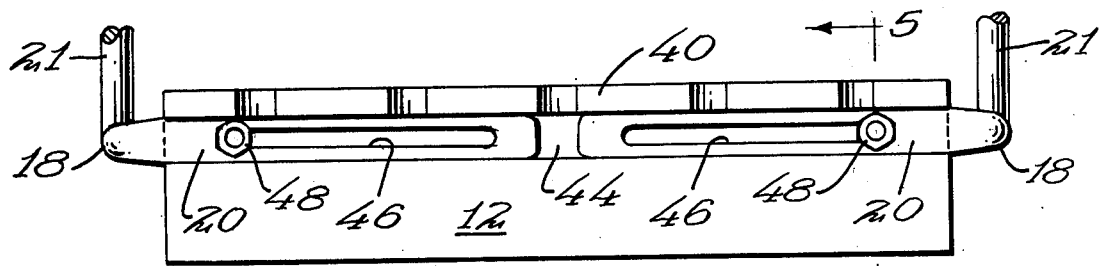
FIG. 4
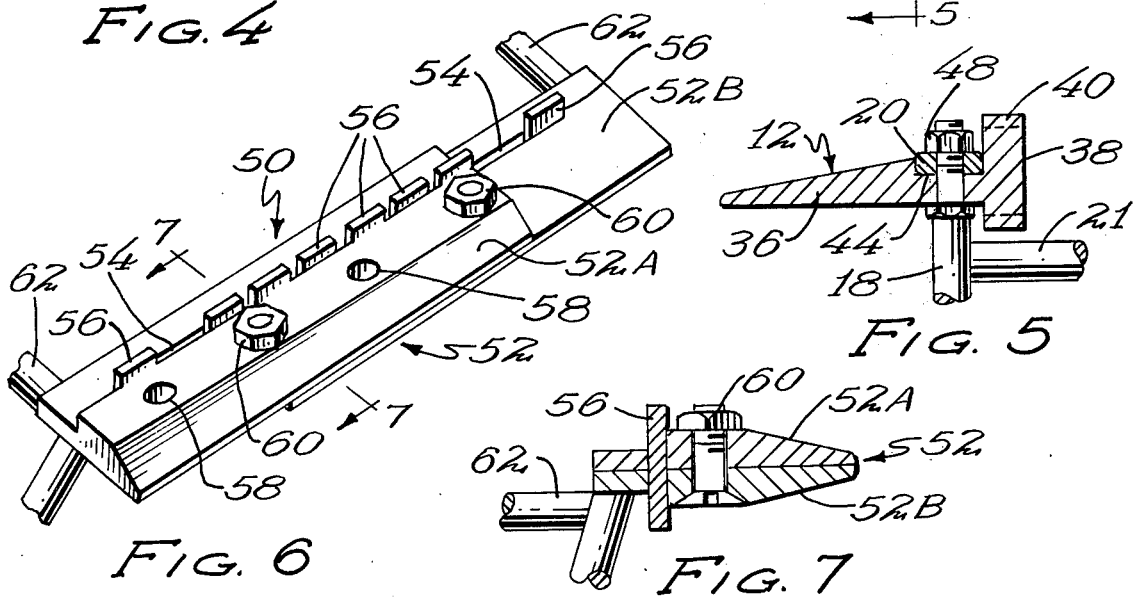
FIG. 6
FIG. 5
FIG. 7

TRACTION DEVICE

This invention relates to a traction device for mounting on the wheels of vehicles to assist the wheels in gaining traction as they are rotated on low traction surfaces such as mud, ice, snow and the like.

BACKGROUND

Traction devices for application to the drive wheels of vehicles to assist in moving the vehicle when it is otherwise mired are known to the art and many patents exist on them. Some of these devices as depicted in the patents are of a simple wire-like construction as exemplified in U.S. Pat. Nos. 2,625,193 and 2,705,521; others are more complex and disclose special fastening means for securing the devices to the rim or tire of a vehicle such as in U.S. Pat. Nos. 2,664,934 and 2,625,194, which latter includes in addition to a special wheel rim and tire engaging clamp assembly a traction plate having a lug portion overlying the tread surface of a tire with teeth in the opposite surface for biting into the tread surface of the tire.

The present invention provides a novel traction device which is of improved construction so that it is rugged and durable in use while being readily adjustable to fit tires of varying width, which is provided with a unique and highly efficient traction plate structure to grip both tire tread and surface and which has a novel, simple, readily operable and easily managed shoe arrangement for securing or mounting the device on a tire.

The traction device of this invention comprises a pair of spaced apart traction plates adapted to overlie the tread or rolling surface of a vehicle tire joined at their ends by a pair of generally U-shaped radially inwardly extending tire side wall clamping or gripping elements, each having a bight portion and radially outwardly extending legs. To the free ends of the legs of each gripping element are connected the ends of the traction plates in a manner to permit fitting of the device to tires of different widths. Teeth on the plates project radially outwardly and inwardly therefrom for respectively engaging the tire engaging surface and engaging the tread surface of a tire to aid in preventing slippage of the device on the tire; a spring loaded arcuate shoe is swingably mounted on the bight portion of one of the gripping elements to aid mounting the device on a tire and in retaining the device in place on the tire when in use.

The invention is described in more detail in the accompanying drawings wherein:

FIG. 3 is a side view, partially in section of the device mounted on a tire.

FIG. 4 is a top view of one of the plates of the traction device;

FIG. 5 is a cross-sectional view of the plate taken substantially along the plane of section line 5—5 of FIG. 4;

FIG. 6 is a perspective view of a modified form of traction device embodying the invention; and FIG. 7 is a cross-sectional view through the device of FIG. 6.

Figure 1:
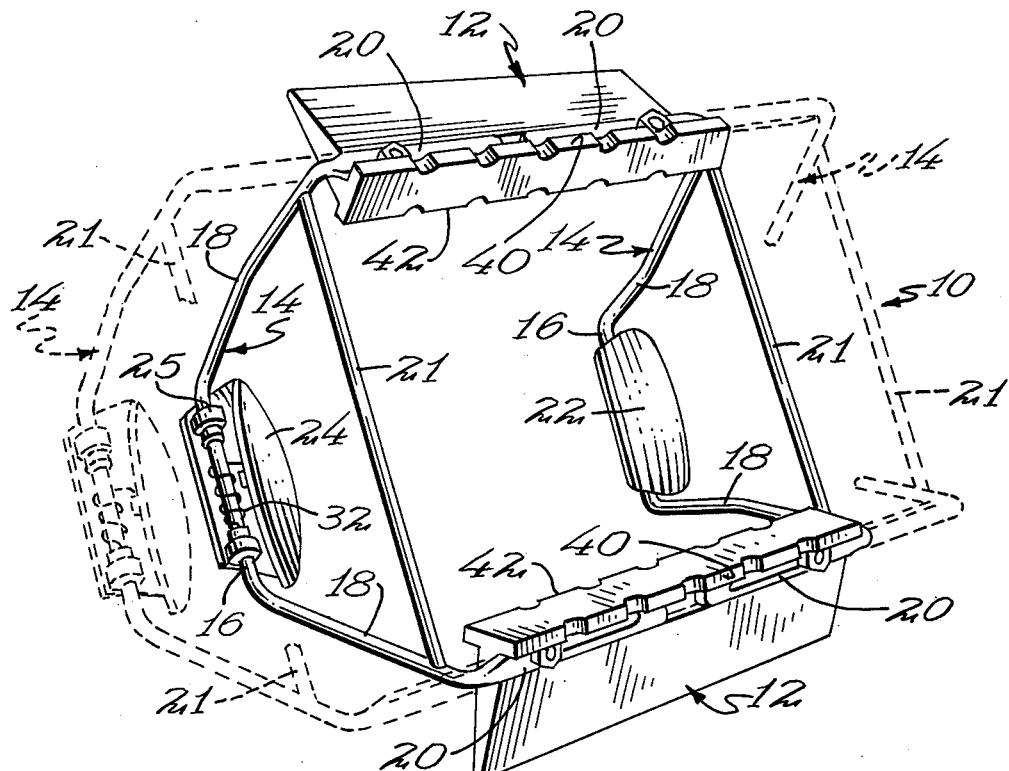
FIG. 1 is a perspective view of a traction device embodying the invention.

Turning now to the drawings in more detail, there is illustrated in FIG. 1 a traction device made in accordance with this invention designated in its entirety by numeral 10. The device comprises a pair of circumferentially spaced axially extending traction plates 12 which are adapted to overlie the tread surface of the tire. The plates are connected to one another by means of axially spaced generally U-shaped tire gripping elements 14 which are adapted to seat against the tire side walls. These elements 14 attach to the traction plates so that they can be moved toward and away from one another in adjusting the device to accommodate the width of the tire on which the device is to be mounted.

Each of the U-shaped gripping elements includes a bight portion 16 and radially outwardly extending diverging legs 18, the free end portions of which are axially inwardly turned to provide projecting arms 20 which are generally parallel to one another and overlie the end portions of the traction plates 12 to which they are firmly but adjustably fastened in a manner which will be hereinafter described. Stiffening bars 21 interconnect the legs 18 of each of the tire side wall gripping elements 14 adjacent the upper ends thereof just below the bend forming the inwardly projecting arms 20 to prevent the plates from spreading apart when in use. The bight portions 16 of the U-shaped gripping elements 14 are equipped with tire side wall engaging facing shoes. Shoe 22 is fixed to the bight of one of the elements 14 and is immobile. The other shoe 24 is fixed to the bight of the other element 14 by journal 25 and swings about the bight. The plates 12 slant away from one another and are not coplanar. The slant of the plates is generally tangential to the tire surface so that they follow the general curvature of the tire on which the device is mounted.

Figure 2:
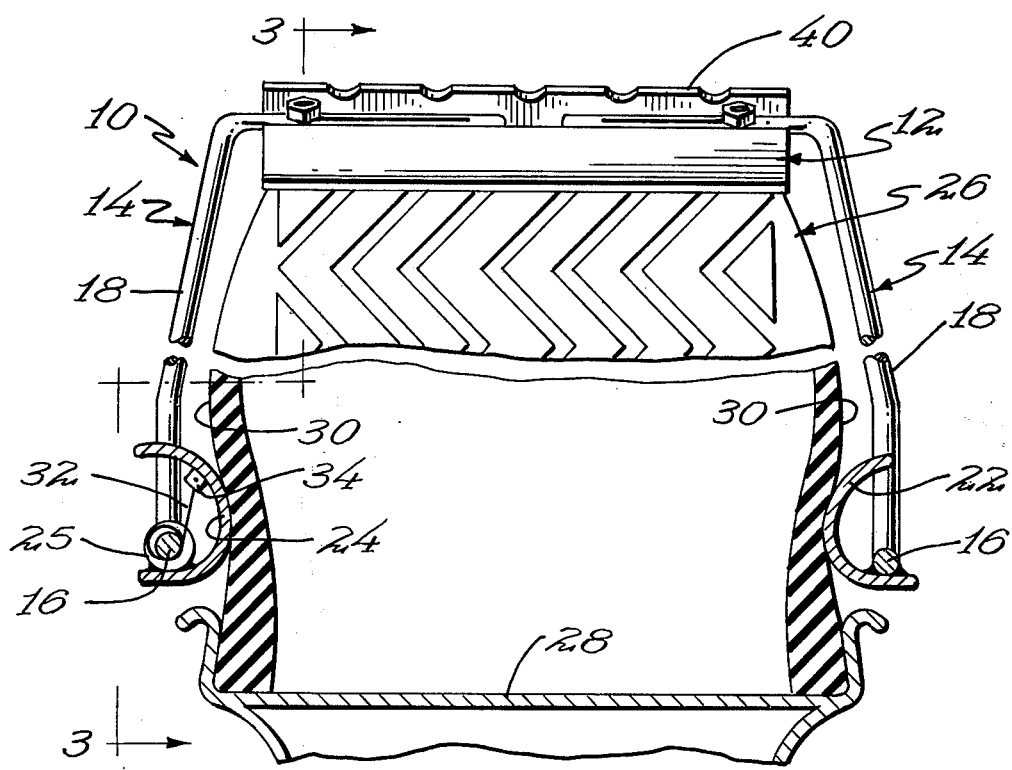
FIG. 2 is a front view, partially in section of the device mounted on a tire.

In FIGS. 2 and 3 the positioning of the traction device 10 on a vehicle tire 26 mounted on the rim of a wheel 28 can be readily observed. The U-shaped gripping elements 14 straddle the tire side walls with the facing shoes 22 and 24 tightly gripping the side walls just above the rim of the wheel. In these views, particularly that of FIG. 2, it can be seen that the shoes 22 and 24 are arcuate in shape, each forming a spiraling arc with the short radius at the connection of the shoe to the bight portion 16 extending inwardly toward the tire side wall with a gradually increasing radius curving away from the tire side wall toward the tip of the shoe as the shoe spirals outwardly away from the side wall 30 of the tire. Shoe 24 is spring loaded to bias the shoe toward the tire side wall by means of spring 32 attached at one end to the bight portion 16 of the gripping element 14 and having the other end attached to a suitable connection 34 attached to the inner surface of the shoe 24 somewhat beyond the point thereof where the shoe begins to curve away from the tire side wall; the spring biases the shoe normally axially inwardly from the bight portion 16.

To mount the device it is simply slipped over the tire with the traction plates spanning the tire tread surface and pressed radially inwardly until the traction plates 12 seat firmly against the tread or ground engaging surface 36 of the tire. As the device is pressed home, the shoe 24 is biased by its spring into engagement with the side wall of the tire, thereby holding the device firmly in place. Once in place, by virtue of its arcuate shape, the more radially outward force exerted in attempting to remove the device, the harder the shoe grips the tire side wall. However, to remove the device, the shoe 24 is simply swung axially outwardly against the spring bias away from the tire side wall and the device lifts easily off the tire.

The plates 12 by virtue of their angled relation to one another seat generally firmly against the peripheral tread surface 36 of the tire through the major portion of their width. As can be seen in any one of FIGS. 1, 2, 3 and 5, each of the plates 12 is generally T-shaped in cross section to provide a relatively long stem 36 with a cross-head 38 at one end thereof. The upper portion of the cross-head 38 comprises a toothed traction bar 40 projecting radially outwardly from the tread surface 36 of the tire to engage the surface of the mud, ice, slippery ground or the like against which the tire is pressed so as to bite into such surface to enable the tire to lower on the surface instead of simply rotationally slipping. The radially inwardly projecting portion of the cross-head 38 provides a toothed bar 42 for engaging the tread surface of the tire to prevent slipping of the device along the tire as the tire is rotated. The stem 36 of the T comprises a relatively broad plate of substantial thickness as it approaches the cross-head 38 but of gradually diminishing thickness as it approaches the outer edge or tip of the stem of the T. This shape aids in preventing gravel or the like from penetrating underneath the plate; it also enables wedging of the plate between the tire tread and the tread engaging surface to cause the toothed bar 40 of the plate to be in intimate engagement with the surface before applying power to the wheel.

Turning specifically to FIGS. 4 and 5 where the adjustability of the device to fit tires of differing widths is most clearly seen, it will be noted that the plate 12 is provided with a groove 44 in the upper surface thereof extending the length of the plate. In this groove the projecting arms 20 of the gripping elements 14 slide and are prevented by the side walls of the plate forming the groove from being laterally displaced. As is most readily observable in FIG. 4 the projecting arms 20 have elongated slots 46 therein so that these arms may slide toward and away from one another along plates 12 to adjust the width of the device 10 to fit tires of different widths. When the desired width is achieved, fastening means 48 connecting the arms of the gripping element 14 to the plates 12 are tightened down and the device is ready to be secured to a tire.

A somewhat different version of a traction device made in accordance with this invention is illustrated in FIGS. 6 and 7, the device being designated generally by the numeral 50 and comprising an adjustable traction plate construction rather than an adjustable gripping element construction as shown in the previously described version. In this version each traction plate 52 comprises a two-piece construction of lapping plates including an upper plate part 52A and a lower plate part 52B. The parts 52A and 52B are adjustable toward and away from one another to vary the length of the plate to adapt it to tread surfaces of different widths. This has the advantage of providing toothed plate coverage for substantially the entire tread width even on large width tires. However, the construction is somewhat more complex and not quite so easy to operate.

Toward its inner edge each plate part is provided with an elongated slot 54 and in that slot at regularly spaced intervals are teeth 56 part of which project radially outwardly to engage the surface on which the tire rides and part of which project radially inwardly to engage the tread surface of the tire. Each plate part likewise is provided with four holes 58. Adjustment is provided by placing one plate part over the other so that the teeth 56 of each plate part interdigitate with the teeth 56 of the other plate by projecting through the slot of the other plate part. By properly aligning the holes 58 with one another the plates can be moved relative to one another to span various tire widths. Upon proper placement the fastening means 60 are fastened into place to rigidify the two-part plate structure.

In the traction device 50 another variation is provided in that the reinforcing or stiffening bars 62 extend directly between the traction plates and attach at their ends to the plates rather than to the legs of the U-shaped gripping elements.

From the foregoing description it will be apparent that the invention is not confined to the specific constructions described and it is to be understood that the invention comprehends such changes in construction as may be permitted within the scope of the appended claims.

I claim:

1. A traction device for assisting a drive wheel of a vehicle in gaining traction on slippery surfaces comprising a pair of traction plates adapted to overlie the rolling surface of a vehicle tire at circumferentially spaced intervals therearound, a pair of generally U-shaped tire side wall gripping elements each having a bight portion and radially outwardly extending legs, the free end portions of the legs of each gripping element connecting the ends of said plates and maintaining said plates in spaced relation to one another, traction increasing means on said plates projecting both radially outwardly and inwardly therefrom for respectively contacting the surface engaged by the rolling surface of the tire and the tread surface of the tire on which the device is mounted, a spring loaded spirally arcuate shoe swingably mounted adjacent one end thereof on the bight portion of one of said gripping elements and curving inwardly toward the tire side wall and then away from the tire side wall, said spring normally biasing said shoe axially inwardly for engagement with the tire side wall to retain the device in place on the tire when in use.

2. The traction device of claim 1 wherein said device includes adjustable means interconnecting said gripping elements and plates for axial movement of said gripping elements toward and away from one another to mount the device on tires of different widths.

3. A traction device adapted to be secured to a tire comprising a pair of spaced traction plates and a pair of generally U-shaped elements attached thereto and maintaining the spaced relation of said plates to one another, the legs of each of said U-shaped elements extending radially upwardly and terminating in axially inwardly projecting arms extending over the ends of said plates, said arms having longitudinally extending slots therein and fastening means carried by said plate and projecting through said slots for adjustably positioning said arms relative to said plates, and guide means on said plate engaging said arms to permit relative movement between said U-shaped elements and said plates, and means attached to the bight portions of said U-shaped elements adapted to secure said device to the side walls of a tire.

4. The device of claim 3 wherein said guide means includes a groove extending the length of each of said plates in which said arms slidably seat.

5. The device of claim 3 wherein said means for securing said device to the side walls of a tire comprises at least one arcuate shoe attached to the bight portion of one of said U-shaped elements, said shoe being pivotally attached at one end portion thereof to said one bight portion and curving inwardly and upwardly toward the side wall and then outwardly therefrom, said shoe having spring means interconnecting it with said one bight portion to normally bias it inwardly toward the tire side wall.

6. A traction device for mounting on a tire comprising a pair of spaced traction plates interconnected to one another by a pair of U-shaped elements adapted to grip the side walls of a tire, the free end portions of the legs of each of said U-shaped elements being fixedly attached to one set of ends of said plates, each of said plates comprising separate plate portions movable with respect to one another to vary the length of the plate, each plate having a slot running a portion of the length thereof, the section at each slot toward the outer end of each plate portion being open, the remainder of each said slot having spaced teeth therein attached to the side walls of the plate forming the slot, the space between teeth being greater than the width of each tooth so that the teeth of the upper plate portion interdigitate with the teeth of the lower plate portion as the length of the traction plate is varied, and fastening means interconnecting said plate portions to prevent relative movement therebetween when said traction plate is adjusted to the desired length.

7. The traction device of claim 6 wherein said teeth extend both radially outwardly and inwardly said traction plates.

8. The traction device of claim 6 wherein one of said U-shaped elements includes a shoe pivotally secured to the bight portion thereof and extending upwardly therefrom toward said traction plates and inwardly toward the other U-shaped element securing the opposite ends of said traction plates, said shoe being spirally arcuate and having a progressively longer radius as the shoe rises above said bight portion and spring means interconnecting said bight portion and said shoe above said bight portion normally biasing said shoe inwardly toward the tire side wall.

* * * * *